SEQUENCING MECHANISM ELECTRONIC LOGIC

Filed Sept. 4, 1968 4 Sheets-Sheet 1

SEQUENCING MECHANISM ELECTRONIC LOGIC

SEQUENCING MECHANISM ELECTRONIC LOGIC

Filed Sept. 4, 1968 4 Sheets-Sheet 4

United States Patent Office 3,484,621

Patented Dec. 16, 1969

3,484,621

SEQUENCING MECHANISM ELECTRONIC LOGIC

Frances B. Hugle, deceased, late of Santa Clara, Calif., by William B. Hugle, executor, Santa Clara, Calif., assignor to Hugle Industries, Inc., Sunnyvale, Calif., a corporation of California Filed Sept. 4, 1968, Ser. No. 758,192
Int. Cl. H01h 7/00, 43/00
U.S. Cl. 307—141 10 Claims

ABSTRACT OF THE DISCLOSURE

A sequencing mechanism having electronic logic elements, typically for controlling the sequence of wire bonder operations. In the manual mode two channels of logic allow selection of two preset control values of both time duration and power level for the bond. Repetitive stitch wiring is possible in the manual mode. Wire cut-off and refeed is automatic after each second bond in the automatic mode. Certain mechanical cam switches, coactive with the operational control of the bonder head initiate signals for the logic elements. The logic elements are principally NAND gates and flip-flops. These sequence the timing of the bond, break and refeed the wire, where a single connection between two points is desired.

BACKGROUND OF THE INVENTION

Prior art control and this invention pertains to sequencing devices for controlling a sequence of related operations. This invention employs electronic logic for such control.

The prior art has employed all-mechanical means for such control. A relatively large group of mechanical cam switches actuated by one motor, along with mechanically operated limit switches, have provided control in the prior art. It has been found that these devices are difficult to maintain in adjustment and have a relatively short trouble-free life.

In related fields, electronic logic has employed pulse-counting elements and technique. The sequencing steps are taken after a given number of uniformly timed pulses have been counted.

BRIEF DESCRIPTION OF THE DRAWINGS

Similarly.

Similarly.

DESCRIPTION OF THE PREFERRED EMBODIMENT STRUCTURE

Figure 1:
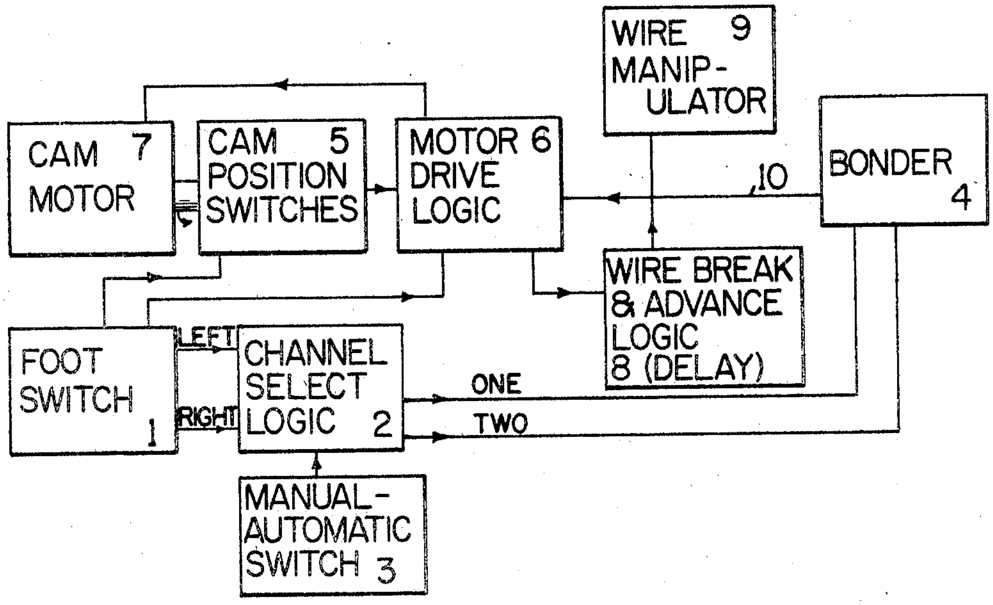
FIG. 1 is a block diagram of the bonder logic and associated elements.

In FIG. 1 numeral 1 identifies typically a foot switch, but this may also be a pair of finger push-button switches. The two switches involved are given "left" and "right" designations for identification. This switch assembly is the principal manual operating control of the electronic logic.

Channel select logic 2 is comprised of a latch and certain gates. It accepts commands from the foot switch and from manual-automatic switch 3. When the latter is in the manual position, two channels of control of bonder 4 are available. These correspond to the left or the right actuation of switch 1 by the operator. Each channel may be set at the bonder for a selected value of time duration and power level employed in making the bond. These parameters are different for bonding on semiconductor chips as compared with bonding on semiconductor packages.

When manual-automatic switch 3 is in the automatic position, channel select logic 2 alternates between channel one and channel two regardless of whether the left or the right side of foot switch 1 is depressed. The first and second bonds may have different settings.

Foot switch 1 is also connected to cam position switches 5 for certain control of motor drive logic 6; which latter is also directly connected to the foot switch. Cam motor 7 is electrically connected to motor drive logic 6 for control thereby, and is mechanically connected to cam position switch 5 for ssuitable acutation thereof.

Wire break and advance logic 8 is connected to motor drive logic 6 for suitable activation in relation to the status of other operations of the sequencing mechanism. Logic 8 provides outputs to actuate wire manipulator 9. What this output will be depends upon whether the mechanism is in the manual or the automatic mode. In the manual mode the wire is allowed to advance without a break if multiple bonds are being made along a single piece of connecting wire. In the automatic mode the wire is broken by stretching after the second bond of a given connection between two points and more wire from a supply spool is advanced to be under the bonding electrode of the bonder for the next bond.

Certain logic units have transistor amplifiers to provide adequate power output, as required. Wire break and advance logic 8 has certain electrical delays to allow mechanical manipulation of the wire. Typically, these delays are provided by capacitors connected to diode gate inputs. Wire manipulator 9 employs electromagnets to translate electric signal power to mechanical motion.

Figure 2:
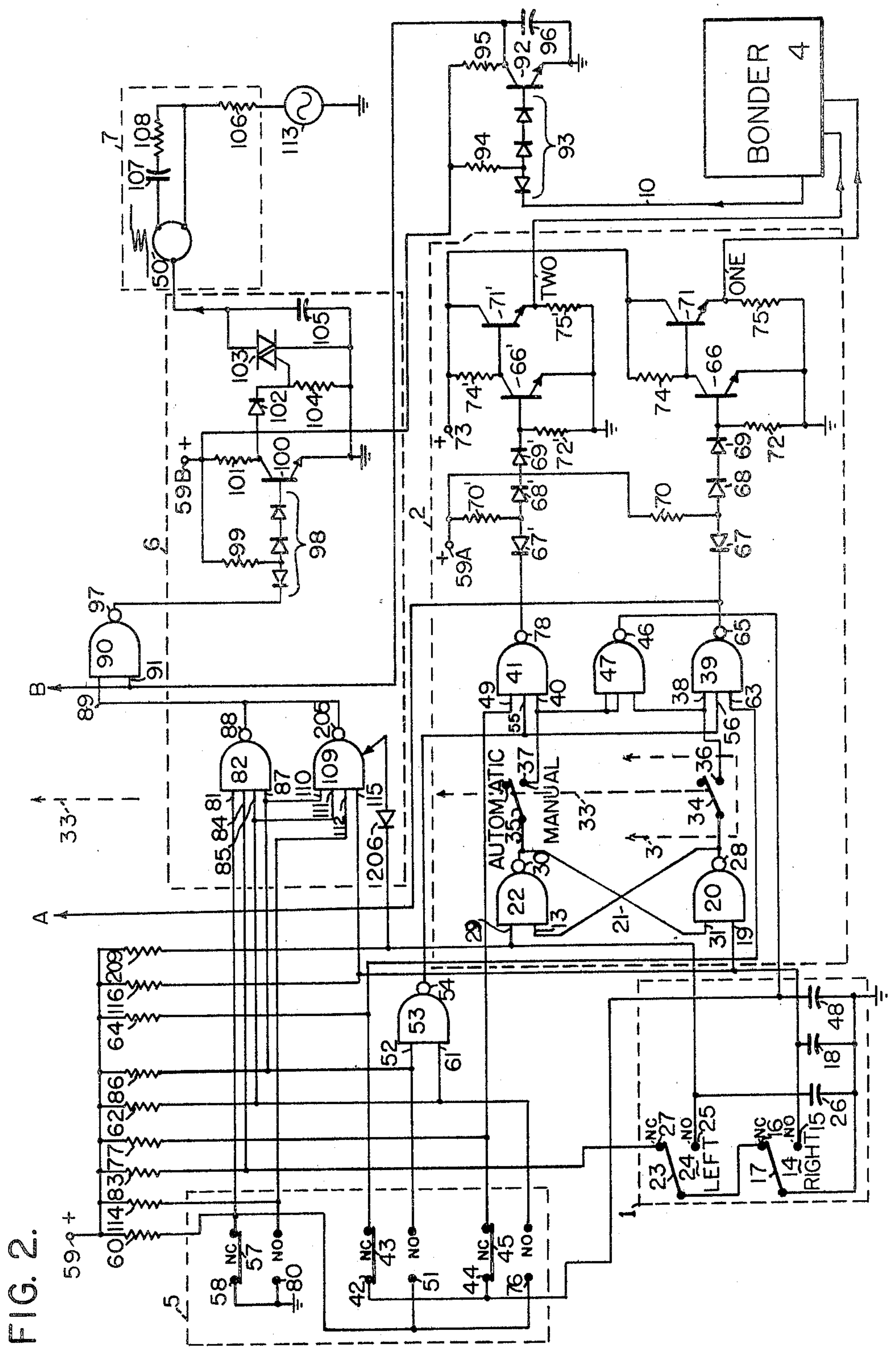
FIGS. 2 and 3 detail the electronic logic. Connections "A" and "B" pass between the two figures.

The schematic diagram, FIG. 2, shows foot switch 1 having a two-pole, two-throw configuration. Right switch 14 has normally open contact 15, normally closed contact 16 and switch arm 17. Contact 15 connects to capacitor 18, typically of 0.1 microfarad ($\mu$fd.) capacitance. The second terminal of this capacitor connects to ground. It serves to prevent electrical "noise"; that is, transients from "bounce" of the contacts of the switch are bypassed to ground. A number of other capacitors elsewhere in the circuits serve the same purpose. Contact 15 also connects to Reset terminal 19 of NAND gate 20 of channel select latch 21; to resistor 116, of 5,600 ohms resistance; and to input 115 of NAND gate 109.

Contact 16 connects to switch arm 23 of left foot switch 24. Normally open contact 25 connects to capacitor 26, which has the same second connection, capacitance and function as capacitor 18, and also to the Set terminal 29 of gate 22 of latch 21. Normally closed contact 27 connects to a voltage source 59, typically of 5 volts positive polarity, to produce a logic-operating signal through resistor 83, of 5,600 ohms resistance, for input 84 of motor drive logic NAND gate 82 when contact 27 is opened.

Channel select latch 21 is completed by a connection between output terminal 28 of NAND gate 20 and input terminal 13 of NAND gate 22, and by a similar connection between output terminal 30 of NAND gate 22 and input terminal 31 of NAND gate 20. The state of outputs 28 and 30 are set by which footswitch was last actuated. If this was the LEFT switch 24, then output 30 is HIGH, this being logical "1," and output 28 is LOW, this being logical "0." If RIGHT switch 14 was last depressed, then output 30 is LOW and output 28 is HIGH.

A triple-pole double throw switch 33 has arm 34 connected to output 28 and arm 35 connected to output 30 of latch 21. When this switch is in the "MANUAL" position the circuit from uotput 28 is connected through contact 36 to input terminal 38 of NAND gate 39. Similarly, the circuit from output 30 is connected through contact 37 to input terminal 40 of NAND gate 41. When switch 33 is on "AUTOMATIC," each of arms 34 and 35 contacts dummy contacts and no connection is made from the outputs of latch 21 to the following circuits.

This results in the channel selection being controlled by the LEFT or RIGHT foot switch in the MANUAL mode through latch 21, switch 33, gates 41, 47 and 39, and transistor drive circuit elements 66 through 75.

In the AUTOMATIC mode, with latch 21 disconnected, channel selection is controlled by switches 43 and 45 of cam position switches entity 5, NAND gate 53, NAND gates 41, 47 and 39, and transistor drive circuit elements 66 through 75. These several devices will be detailed later. What results is that channel TWO, or the LEFT channel, is always used for the first bond of a pair and channel ONE is always used as the terminating, or second bond, of the pair.

Three cam switches comprise the cam position switches entity 5 of FIG. 1. These are detailed in FIG. 2. Each is a single-pole, double-throw switch operated by a revolving cam. Such switches are manufactured by the Licon organization.

The normally closed ("NC") position 42 of switch 43 and the normally closed position 44 of switch 45 are connected to the output 46 of NAND gate 47, and also to capacitor 48, which has the same capacitance and function as capacitor 18. NAND gate 47 is the third in the group which also includes gates 39 and 41. These gates perform the function of connecting either latch 21 or the channel select cam switches 43 and 45 to the channel select drive circuits, to be later described. Effectively, either the foot switch or switches 43 and 45 select the channel, depending upon whether MANUAL-AUTOMATIC switch 33 is in the former or the latter position, respectively.

In the normally closed position switch 45 connects the output 46 of NAND gate 47 to input 49 of NAND gate 41. When either the LEFT or the RIGHT foot switch is actuated, cam motor 50 is energized and runs until cam switch 57 changes state; i.e., changes from normally closed position 58 to open position 80. At this point the work is manipulated by known manual controls until it is positioned directly over the bond point, and the foot pedal is then released.

In open position 51, cam switch 43 connects a source of voltage 59, previously described, through resistor 60, of 5,600 ohms resistance, to input 52 of dual input NAND gate 53. This provides a logic "1" signal when switch 57 is in the open position, at contact 80. Otherwise, both teminals (contacts) 51 and 76 are grounded through the normally closed contact 58 of switch 57. Output 54 of NAND gate 53 connects to an input 55 of NAND gate 41 and to an input 56 of NAND gate 39.

After foot pedal 1 is released by the operator, cam motor 50 continues to run until cam switch 57 changes state, from the normally open to the normally closed position 58. This causes the positive logical "1" signal to cease because of the ground connection to contact 58, as has been described. Prior to this action, a positive 5 volt signal is impressed upon input 52 of NAND gate 53, by switch 43 contacting contact 51. A similar logical "1" signal already exists at the second input 61 of this gate, by virtue of a connection to the source of voltage 59 through resistor 62, of 5,600 ohms. This enables NAND gate 53 and an output proceeds from output terminal 54 to previously described inputs 55 and 56.

Switch 43 being open (away from contact 42), input 63 of NAND gate 39 receives an input from source of voltage 59 through resistor 64, of 5,600 ohms. Assuming that the right foot switch was actuated, an output from NAND gate 20 to input of NAND gate 39 is also present, All the inputs to gate 39 thus being supplied, an ouput of opposite polarity (because of the NAND nature of the gate) appears at output 65. This supplies a signal to the base of transistor 66, through diodes 67, 68 and 69. The former is polarized with cathode to output 65 and so ceases to conduct when that output goes positive. This allows an additional source of voltage 59A (positive 5 volts) to be effective as a positive voltage at the base of transistor 66 through resistor 70, of 2,200 ohms, and diodes 68 and 69. The latter or both poled with anodes toward the source of positive voltage, and so conduct.

Transistors 66 and 71 comprise an emitter-follower configuration to provide low output impedance in the HIGH state. These are NPN conductivity transistors. The base of transistor 66 is connected to ground through resistor 72, typically of 3,300 ohms resistance. The emitter is connected directly to ground, and the collector directly to the base of transistor 71. The collector is also connected to a source of positive voltage represented by terminal 73, say of 18 volts with respect to ground, through resistor 74, of 1,500 ohms resistance. The collector of transistor 71 is directly connected to source 73, while the emitter is connected to ground through resistor 75, of 15,000 ohms, which serves as an output resistor.

The output of the channel is taken from the emitter of transistor 71 and connects to a control circuit in the known bonder 4 of FIG.1, via connection ONE. The bonder may be a Sonobond ultrasonic solid-state 10 watt duel-channel ultrasonic generator and transducer, such as the Model W–160. This device produces and then transduces 61 kilocycle alternating electrical energy to unidirectional mechanical vibration, to plastically deform the interface between the wire to be bonded and the bonding pad on the semiconductor workpiece.

Continuing with the alternate aspect of this structure, when the right foot switch is not operated, but the left one is operated, an enabling input from contact 25 passes to input 29 of NAND gate 22. An output therefrom at 30 passes through arm 35 of switch 33 to contact 37, this switch being in the MANUAL mode for this description, and an enabling input to provided at 40 for NAND gate 41. The output therefrom, at 78, passes to a second diode-emitter-follower circuit, having elements 66′ through 75′ and being identical to the first circuit having these digits that has been described. An output thus passes via connection TWO to bonder 4. This second channel for bonder activation may be set within the same for a time duration and power level different than that set for connection ONE, thus accomplishing an object of this invention.

In the motor drive logic 6, NAND gates 82 and 109 are connected in a COLLECTOR "OR" configuration; i.e., the signal to input 89 of succeeding NAND gate 90 is HIGH only if *both* gates 82 and 109 outputs are HIGH. Also, at least one input to both of gates 82 and 109 must be LOW for the input 89 to gate 90 to be HIGH.

Structurally, input 81 of NAND gate 82 connects to source of voltage 59 through resistor 60, of 5,600 ohms, and to cam switch 57 through normally closed contact 58 and thence to ground. Input 84 connects to source of voltage 59 through resistor 83, of 5,600 ohms, and to the normally closed contact 27 of LEFT foot switch 24. Input 85 connects to source of voltage 59 through resistor 62, of 5,600 ohms, and to the normally open contact 76 of cam switch 45. Input 87 connects to source of voltage 59 through resistor 86, of 5,600 ohms, and to normally open contact 51 of cam switch 43. Input 87 also connects to input 110 of NAND gate 109; as does input 85 to input 111.

Input 112 of gate 109 connects to source of voltage 59 through resistor 114, and to normally open contact 80 of switch 57. Input 115 connects to source of voltage 59 through resistor 116, and to normally open contact 15 of foot switch 14 (RIGHT). Resistors 114 and 116 have resistances of 5,600 ohms each. A still further input to NAND gate 109 is taken through the externally provided diode 206 from source of voltage 59 through resistor 209, of 5,600 ohms, and to normally open contact 25 of foot switch 24 (LEFT).

Output 88 of NAND gate 82 and output 205 of NAND gate 109 are connected to input 89 of dual input NAND gate 90. The other signal, to input 91, originates in bonder 4 and is conveyed via conductor 10. This is a known inhibiting signal, available from the bonder per prior specification herein. It occurs during the "firing," or actual bonding sequence of the bonder. This sequence occupies an interval of from 30 milliseconds to 3 seconds, as selected by the operator on this control on the bonder. When the inhibit signal ceases an input is supplied to input 91 via transistor 92.

The base of this NPN transistor is connected to a series of three diodes, identified as a group by numeral 93, and resistor 94, of 5,600 ohms, connected as previously described for diodes 67–69 and resistor 70. Resistor 94 connects to a source of voltage 59B, equivalent to prior source 59. The emitter of the transistor is connected directly to ground, as was the emitter of transistor 66, previously. The collector of transistor 92 is connected to source 59B through resistor 95, of 2,200 ohms. Capacitor 96, of 0.1 $\mu$fd. capacitance, is connected between the collector of transistor 92 and ground, for the suppression of noise, as previously explained with respect to capacitor 18.

Continuing with the structure, the output terminal 97 of NAND gate 90 is connected to a series of three diodes 98 and a resistor 99. These are connected the same as diodes 93 and resistor 94 just described. Resistor 99 typically has a resistance of 2,200 ohms. Following the prior pattern, transistor 100 is connected with base to diodes 98, the emitter to ground, and the collector to resistor 101, of 360 ohms resistance, and therethrough to source of voltage 59B.

The output from the collector of transistor 100 is connected through voltage level shifting diode 102, with the anode thereof connected to the collector to pass positive pulses, to the trigger electrode of TRIAC 103. This is a known four-layer device, usually of silicon, which is effective in blocking alternating current if in the "off" mode. RCA and General Electric are typical manufacturers of the device. A 1,000 ohm resistor 104 is connected from the trigger electrode to ground. Capacitor 105, of 0.02 $\mu$fd., is connected from the anode of TRIAC 103 to ground to suppress switching transients. The cathode of TRIAC 103 is connected directly to ground. The anode thereof is connected directly to one terminal of cam motor 50, the whole entity of which is 7 in FIG. 1. This energizes the motor when current is passed by the TRIAC. The second terminal of motor 50 is connected through resistor 106, of 200 ohms resistance, to a source of 135 volts RMS alternating current 113. The second terminal of 113 is connected to ground so that the power circuit is completed through the cathode of TRIAC 103.

Motor 50 is of the synchronous type, such as the known Slosyn motor manufactured by Superior Electric Co. From a third terminal of the motor capacitor 107, of 0.75 $\mu$fd., is connected in series with resistor 108, of 500 ohms, to the motor side of resistor 106. These known phase-shifting elements are required for the operation of the motor.

Figure 3:
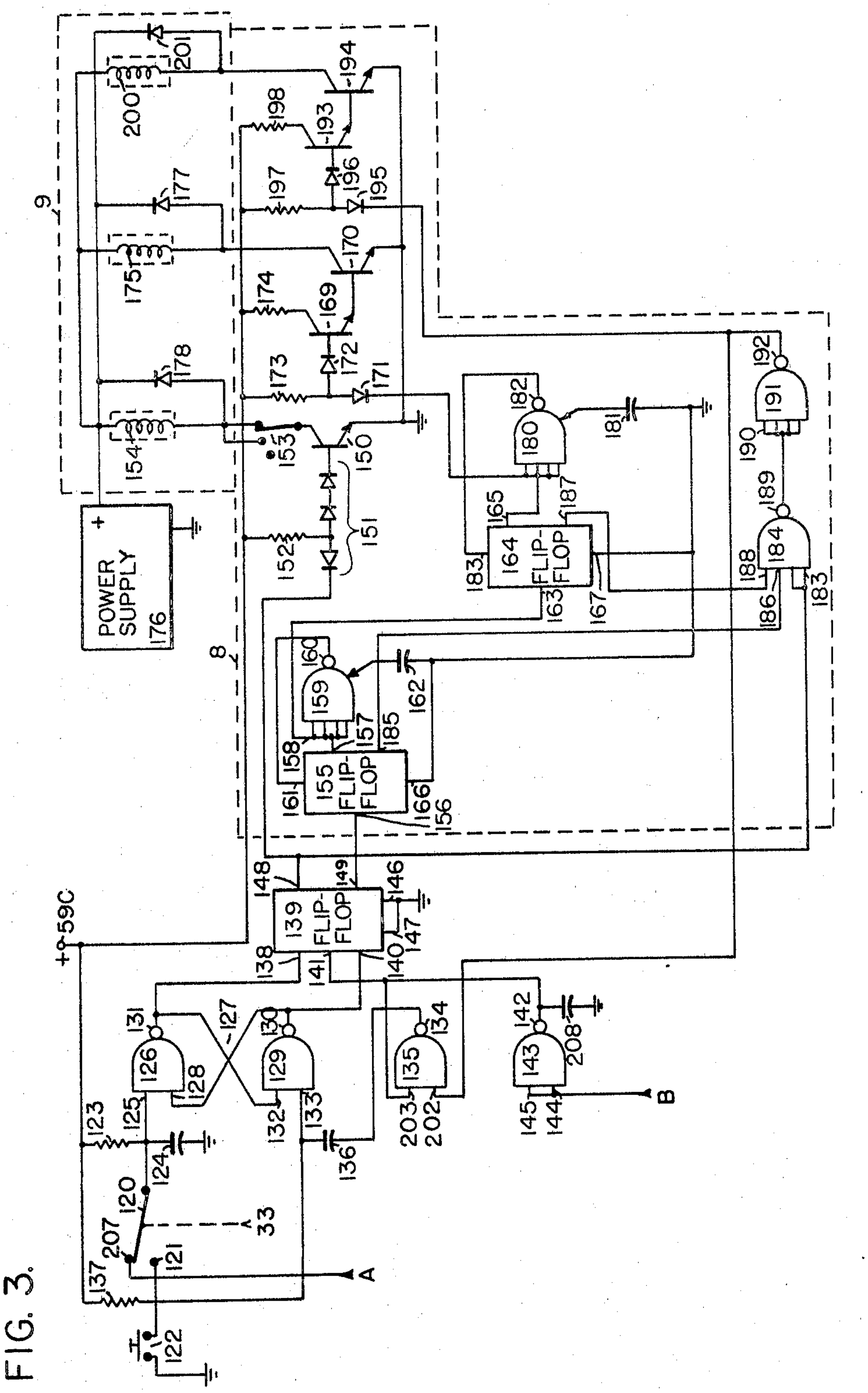

FIG. 3 details the wire break and advance logic, elements 8 and 9 of FIG. 1. When arm 120, which is part of the triple pole AUTOMATIC-MANUAL switch 33, is at MANUAL, contact 121 is engaged. This connects to manual break switch 122, which is the momentary circuit closing type. The second terminal of this switch is connected to ground. in the MANUAL mode, or the "stitch bonding" mode thereof, switch 122 must be actuated prior to the last of a series of bonds so that the operation in which the wire has connected two or more points on a semiconductor substrate will be terminated and the wire from the supply reel advanced again to be under the bonding head for the next connection to be made. Actuating switch 122 gives a ground or zero volt signal instead of the otherwise approximately five volts positive signal obtained from source of voltage 59C through resistor 123, of 5,600 ohms resistance. Capacitor 124, of 0.1 $\mu$fd., gives a relatively gradual rise and fall of the zero volt pulse, preventing transients, which would give spurious operation.

This pulse is applied to input 125 of NAND gate 126 of latch 127. This latch is similar to latch 21, previously described. The second input 128 of gate 126 is connected to output 130 of NAND gate 129. Similarly, output 131 of the NAND gate 126 is connected to input 132 of NAND gate 129.

Input 133 of gate 129 is supplied from output 134 of dual NAND gate 135 through capacitor 136, of 0.005 $\mu$fd. capacitance. In the absence of such a signal, input 133 is held at approximately plus 5 volts (i.e., HIGH, or logical "1") by a connection to source of voltage 59C through resistor 137, of 1,000 ohms resistance.

Output 131 of gate 126 of latch 127 also connects to the "J" terminal 138 of flip-flop 139. Similarly, output 130 is connected to the "K" terminal 140 of this flip-flop. Terminal 141 thereof accepts clock pulses from output 142 of dual NAND gate 143. Output 142 of gate 143 is shunted to ground by capacitor 208, of 0.1 $\mu$fd., for noise suppression. Inputs 144 and 145 of NAND gate 143 are connected together, so that only one event is required to produce an output therefrom. The "clock" impulse here is the cessation of the cycle inhibit signal from bonder 4, via conductor 10 of FIGS. 1 and 2. This impulse is supplied from the collector of transistor 92, of FIG. 2. Thus, when inputs 138 and 140 of flip-flop 139 are in enable status, upon completion of the bond assumed in progress the arrival of the clock pulse at input 141 causes the flip-flop to change state.

In commercially obtainable flip-flop 139, $P_J$ input 146 and $P_K$ input 147 are not used, and so are connected to ground. The outputs utilized are "Q," 148, and "$\overline{Q}$," 149. Upon enabling inputs at 138 and 140 being present, terminals 148 and 149 reverse their states, with "Q" going HIGH (a more positive voltage) and "$\overline{Q}$" going LOW, upon the arrival of the clock signal at input 141.

The "Q" terminal 148 is connected to the base of transistor 150, through three series diodes 151 as a group; these being the same as previously described diodes 67, 68, 69. Also as before, resistor 152, of 680 ohms, connects from the diodes to source of voltage 59C to produce the desired signal. The emitter of NPN transistor 150 is connected to ground. The collector of the same connects to three-position switch 153, which normally connects through to wire clamp solenoid 154. When "Q" goes HIGH transistor 150 conducts and the wire clamp grips the wire that is used for the connections being made by the bonder.

Switch 153 may be opened from its normally closed position shown in FIG. 3, to allow wire clamp 154 to open independent of the cycle of the bonder. This is useful for initially threading the bonding wire through the wire clamp mechanism.

The second terminal of wire clamp solenoid 154 connects to a source of current, power supply 176. Typically, this has a D.C. voltage of 6 volts. The solenoid itself has approximately 575 turns of No. 40 wire and is actuated by a current of 100 to 120 milliamperes.

Another flip-flop 155 is connected with its clock terminal 156 to the "$\overline{Q}$" output 149 of flip-flop 139. Connection 166 of flip-flop 155 is connected to ground. This is the clock input; clocked set input, more specifically. The "Q" terminal 157 of flip-flop 155 connects to input terminal 158 of NAND gate 159, and the output 160 thereof connects back to terminal 161, which is the direct reset input to flip-flop 155. NAND gate 159, as others of the same symbol, may be characterized as a diode-input gate.

The response from NAND gate 159 is delayed by the connection of capacitor 162 between the expander terminal and ground. As shown in FIG. 44, the expander terminal 221 is connected to the side of the plural diodes of the gate opposite to the inputs to these diodes. The capacitor must be charged before the inputs to the diodes is effective in actuating the gate, thus accomplishing the delay sought. Capacitor 162 preferably has a capacitance of 10 $\mu$fd., which gives a delay of approximately 10 milliseconds in the output of this NAND gate. This permits wire clamp solenoid 154 to operate mechanically prior to enabling of other magnets, as will be described later. It will be noted that this capacitor circuit, along with flip-flop 155 and NAND gate 159 constitutes a novel electrical arrangement for obtaining a time delay for the operation of a mechanical device. This circuit arrangement may also be termed a one-shot or monostable multivibrator.

Not only is terminal 158 of NAND gate 159 connected to the "Q" output 157 of flip-flop 155, but the clock input 163 of flip-flop 164 is also so connected. After the delay of 10 milliseconds accomplished by capacitor 162 of NAND gate 159, the output 160 of the latter, being fed back to terminal 161 of flip-flop 155 causes the latter to again change state and the "Q" output thereof at terminal 157 goes LOW. This shifts the "Q" terminal 165 of flip-flop 164 to HIGH.

The spatial position of terminals on the flip-flops in the symbolic representation of FIG. 3 follow the convention that logic inputs which change and clock lines enter the rectangular flip-flop symbol from the left; outputs, "Q" and "$\overline{Q}$," leave from the right; and conditioning signals usually at ground or power supply potentials, at the top and bottom.

The clocked set input terminal 167 of flip-flop 164 is connected to ground, as was the corresponding terminal 166 of flip-flop 155. Terminal 165 of flip-flop 164 is connected to a Darlington pair of transistors 169–170 through diodes 171 and 172. Diode 171 is connected with cathode toward terminal 165, thus passing negative-going signals, while diode 172 is oppositely connected to allow a positive signal to be impressed upon the base of transistor 169 from source of voltage 59C through resistor 173, of 2,200 ohms resistance. The emitter of transistor 169 is connected directly to the base of transistor 170 and the emitter of the latter is connected to ground; both of these transistors being of the NPN type. The collector of transistor 169 is connected to positive source of voltage 59C, through resistor 174, of 470 ohms. The collector of transistor 170 connects directly with electromagnet 175. The latter is a product of Live Electric Co., Parsippany, N.J., having a resistance of 32 ohms, suited for operation on 6 volts D.C., and actuating on a current of 160 milliamperes to pull and break the wire being bonded to the semiconduction substrate workpiece through the intermediary of a magnetic-attract armature. The second terminal of magnet 175, and of wire clamp 154 as well, is connected to a source of direct current having a voltage of the order of 6 volts. This may be the known rectifier-filter type of power supply 176.

Diode 177 is connected across magnet 175, with the anode connected to the collector of transistor 170. The diode clips the voltage transient which occurs when the magnet is de-energized. Diode 178 is similarly connected across wire clamp solenoid 154.

The "Q" output 165 of flip-flop 164 is also connected to the whole input of NAND gate 180, which has capacitor 181 connected from the expander terminal to ground. This is the same arrangement as was described in connection with NAND gate 159 and capacitor 162; however, in the present instance capacitor 181 has a capacitance of the order of 200 $\mu$fd. and the delay is of the order of 200 milliseconds. The output terminal 182 of NAND gate 180 is connected as feedback to terminal 183 of flip-flop 164. At the end of the delay period the "Q" terminal 165 is reset LOW and magnet 175 is de-energized.

The "Q" terminal 148 of flip-flop 139 is connected to input terminal 183 of NAND gate 184. The "Q" terminal 185 of flip-flop 155 is connected to input terminal 186 of NAND gate 184. The "Q" termial 187 of flip-flop 164 is connected to input terminal 188 of NAND gate 184. When these terminals are all HIGH, as when the first two magnetic devices 154 and 175 have been actuated, NAND gate 184 is enabled. The output terminal 189 thereof connects to all the input terminals 190 of inverter NAND gate 191. The output 192 thereof is connected to a Darlington pair of transistors 193–194 through diodes 195 and 196. These diodes, resistors 197 and 198, and transistors 193–194 are connected to have the same circuit values and characteristics as those just previously described; i.e., elements 169 through 174.

The collector of transistor 194 connects directly to magnet 200. The latter is an electromagnet having the same characteristics as magnet 175, being part No. 40–389–1 W/CL–13–4–32 of that manufacturer and operating on 160 milliamperes. It re-feeds the wire under the bonding tip in preparation for the next bond. As with diodes 177 and 178, diode 201 is connected across a magnet, element 200 in this instance, with the cathode connected to the positive source of supply voltage. The purpose is to clip the voltage transient spike when magnet 200 is de-energized.

At the same time as an output signal is produced at output of 192 of NAND gate 191, the connection back to input 202 of NAND gate 135 results in an output from output terminal 134 thereof. This resets latch 127 to handle the next operation involving manipulation of the bonding wire. A signal to the other input 203 of NAND gate 135 has previously been supplied by the clock functioning of NAND gate 143, from output 142 thereof.

OPERATION

The invention will be further understood by the following description of the operation of the structure presented above.

The operation of the cam motor drive and logic is tabulated as follows:

(1) For motor 50 of FIG. 2 to operate, TRIAC 103 must be ON.

(2) For TRIAC 103 to be ON, NPN transistor 100 must be OFF, with its collector HIGH and voltage from source 59B through resistor 101 and diode 102 gating the gate of the TRIAC.

(3) For transistor 100 to be OFF (no base drive), output 97 of NAND gate 90 must be LOW.

(4) For gate 90 to be ON (output LOW), *both* inputs 89 and 91 must be HIGH.

(5) Input 91 to gate 90 is HIGH at all times except during the bonding pulse, at which time a HIGH signal on conductor 10 from the bonder turns NPN transistor 92 ON and this in effect conducts input 91 of gate 90 to ground; i.e., supplies a LOW signal. Coincidentally, this LOW signal from transistor 92 is inverted by NAND gate 143, of FIG. 3, and supplies the clock pulse to input 141 of flip-flop 139.

(6) Input 89 to gate 90 is HIGH only when *both* NAND gates 82 and 109 are OFF; outputs 88 and 205 both being HIGH.

(7) Accordingly, at least one input to each NAND gate 82 and 109 must be LOW *and* the inhibit signal on line 10 from the bonder must be absent, that is, LOW, before cam motor 50 will operate.

(8) The motor drive logic inputs 81, 84, 85, and 87 of NAND gate 82 and inputs 110, 111, 112, 115 and 206 of NAND gate 109 control the operation of cam motor 50. If all inputs to either gate are HIGH, the motor will be OFF.

(9) Before a sequencing cycle of the whole machine starts, these inputs are in the following states:

(A) Input 81 is LOW, being grounded through switch 57 at contact 58.

(B) Input 84 is LOW, being grounded by both foot switches 24 and 14 in series.

(C) Inputs 85 and 111 are HIGH, switch 45 normally open contact 76 being open and the inputs supplied with a HIGH signal from source of voltage 59 through resistor 62.

(D) Inputs 87 and 110 are HIGH, switch 43 normally open contact 51 being open and the inputs supplied with a HIGH signal from source of voltage 59 through resistor 86.

(E) Input 112 is HIGH, switch 57 normally open contact 80 being open and the input supplied with a HIGH signal from source of voltage 59 through resistor 114.

(F) Input 115 is HIGH, foot switch 14 normally open contact 15 being open and the input supplied with a HIGH signal from source of voltage 59 through resistor 116.

(G) Input 206 is HIGH, foot switch 24 normally open contact 25 being open and the input supplied with a HIGH signal from source of voltage 59 through resistor 209.

(10) Since inputs 110, 111, 112, 115 and 206 are all HIGH, motor 50 will not operate.

(11) When either foot switch 14 or 25 is depressed, input 84 goes HIGH and either of inputs 115 or 206 go LOW. Thus, the motor operates.

(12) When cam switch 57 actuates, input 81 goes HIGH, all inputs to gate 82 are now HIGH, and the motor stops. At the same time input 112 goes LOW through normally open contact 80 of switch 57 being closed and thus grounding this input.

(13) When the foot switch is released by the operator, input 84 goes LOW, inputs 115 and 206 are both again HIGH; cam motor 50 operates because input 84 to gate 82 and input 112 to gate 109 are LOW.

(14) During this period while the motor is operating, cam switch 45 changes to the normally open contact 76. This changes input 49 to gate 41 from LOW to HIGH. Input 40 to gate 41 is HIGH because switch 33 is open (the AUTOMATIC mode). Input 55 to gate 41 is LOW because both inputs to gate 53 are HIGH. Input 52 of gate 53 is HIGH because it is connected to source of voltage 59 through resistor 86 and to the normally open contact 51 of switch 43. Input 61 is HIGH because it is connected to source of votage 59 through resistor 62 and to normally open contacts 76 of switch 45, thence to normally closed contact 58 of switch 57, which is open at this moment) and to source of voltage 59 through resistor 60.

(15) When cam switch 57 changes back to normally closed contact 58 a power pulse is started in channel TWO (LEFT) and cam motor 50 is stopped during the duration of the ultrasonic pulse as follows.

Input 81 to NAND gate 82 goes LOW; this being redundant at this particular moment since input 84 is already LOW. Input 112 goes HIGH but input 111 goes LOW through normally open contacts 76 of switch 45 and normally closed contact 58 of switch 57 to ground. These changes alone would cause cam motor 50 to continue to operate.

However, input 61 to NAND gate 53 also goes LOW through switches 45 and 57 to ground. Output 54 of gate 53 then goes HIGH. Since all inputs to gate 41 are now HIGH, output 78 thereof goes LOW and the drive circuit 66′ to 75′ fires bonder 4 to provide the ultrasonic pulse.

Via conductor 10 a positive 18 volt signal appears at the cathode of the first of diodes 93 for the duration of the ultrasonic pulse and input 91 to NAND gate 90 goes LOW. This causes the cam motor 50 to cease to operate for the duration of the ultrasonic pulse.

(16) When input 91 goes back to HIGH at the end of the ultrasonic pulse, motor 50 operates again until cam switch 45 terminates in the normally closed position at contact 44. This stops the motor by changing input 111 from LOW to HIGH, making all inputs to gate 109 HIGH.

The above actions complete half of an AUTOMATIC cycle. The second half is completely analogous, with switch 43 acting instead of switch 45, gate 39 instead of gate 41, channel ONE instead of TWO, and the additional feature of the wire clamp signal from output 65 of gate 39 to switch contact 207 to input 125 of NAND gate 126, thus setting latch 127 so that the wire clamp logic will operate.

The operation of the sequencing mechanism in the AUTOMATIC mode is as follows.

(1) All switches are assumed positioned as shown in the schematic diagrams of FIGS. 2 and 3.

(2) When the foot switch is depressed, either 14 or 24, cam motor 50 operates until cam switch 57 opens.

(3) When the foot switch is released the cam motor continues to operate until cam switch 57 returns to normally closed position 58.

(4) During the preceding operation the cam positions on the camshaft are so circumferentially arranged that cam switch 45 opens and remains open, temporarily.

(5) When cam switch 57 returns to its normally closed position at contact 58 a signal is sent to a channel of bonder 4 to fire; i.e., to provide an ultrasonic bonding pulse. In the present case channel TWO or the LEFT channel is engaged. While bonder 4 is supplying the ultrasonic pulse an inhibit signal to the cam motor logic circuits stops the motor for the duration of the bonding to one of eleven steps extending over the range of from power pulse. This duration may be set by the operator 30 milliseconds to 3 seconds by a control on the known bonder.

(6) The inhibit signal from bonder 4 also supplies a clock pulse to the wire clamp logic, causing wire clamp 154 to open and also to assume a rest position. Prior to this clock pulse, wire clamp magnet 154 and wire extend magnet 200 were energized, while wire break magnet 175 was off. After the clock pulse, all magnets of wire manipulator 9 are off.

(7) At the end of the inhibit pulse, cam motor 50 again operates until switch 45 returns to the normally closed contact 44.

(8) Above steps (2) through (7) are repeated for the second bonding sequence, with the difference that the other channel, ONE, is employed and the following additional differences.

Switch 43 is active instead of switch 45. The clock pulse to the wire clamp logic starts the following terminating sequence.

(9) Wire clamp magnet 154 acts. Ten milliseconds later wire break magnet 175 is energized for 200 milliseconds and then is deenergized. Wire extend magnet 200 then is energized and remains energized.

(10) At the end of this complete AUTOMATIC cycle, the mechanism is back in the same condition as in the first step above. The wire is clamped and extended and remains so until the end of the first bond pulse of the next cycle.

The operation of the sequencing mechanism in the MANUAL mode is as follows.

(1) Switch 33 is placed in the MANUAL position.

(2) The channel (ONE or TWO) to fire the bonder 4 is now selected by the foot switch, 14 or 24, instead of by switches 43 and 45 of the cam entity.

(3) The wire clamp magnet 154 is now controlled by MANUAL push-button 122 instead of the second bond signal from the output of gate 39. This control is effected through conductor "A," which passes from FIG. 2 to FIG. 3.

(4) The sequence of operations given above under AUTOMATIC remains the same except as follows.

(5) Wire clamp 154 opens and moves to the rest position after the first bond. This first bond may be accomplished by employing either channel ONE or TWO.

(6) Wire clamp 154 remains inactive throughout any desired number of bonds (cycles of the mechanism) until MANUAL push-button 12 is momentarily depressed.

(7) Action 6 changes the state of latch 127. At the next bond pulse, the clock pulse to flip-flop 139 initiates the sequence of paragraph (9) above.

DETAILS OF CIRCUIT ELEMENTS

Figure 4:
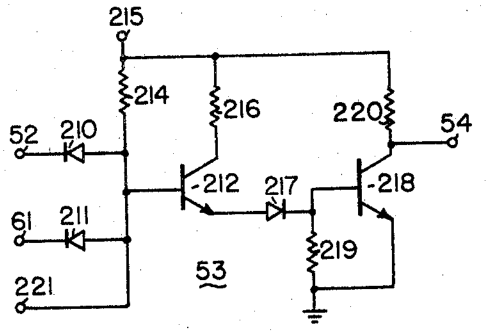
FIG. 4 is a schematic diagram for the typical NAND gate employed. This gate is shown symbolically in FIGS. 2 and 3.

FIG. 4 is the schematic diagram for a typical NAND gate element shown symbolically in FIGS. 2 and 3, such as gates 53, 126, 129, 135 and 143. Other gates merely have more diode inputs. FIG. 4 shows the known Signetics Gate, type 680A.

Relating the external connections to gate 53 of FIG. 2, a semiconductor diode 210 is connected to input terminal 52, with the cathode connected to that terminal. A second diode 211 is similarly connected to input terminal 61. The anodes of each diode are connected together and to the base of NPN transistor 212, as well as to resistor 214, of 2,100 ohms resistance, and therethrough to a source of voltage at terminal 215, which voltage may be plus 5 volts. The collector of transistor 212 similarly connects to terminal 215 through resistor 216, of 1,000 ohms resistance.

An output is taken from the emitter of transistor 212 through diode 217, which is poled to pass positive waveform excursions. The cathode thereof is connected to the base of phase-inverting transistor 218 and through resistor 219, of 1,800 ohms, to ground. The emitter of the NPN transistor 218 is also connected to ground, while the collector connects to output resistor 220, of 4,000 ohms resistance, and thence to voltage terminal 215. The signal output appears at terminal 54.

Expander terminal 221 allows additional gate diode inputs, the same as diodes 210 and 211, to be added in the conventional use of the NAND gate. However, herein, a new use has been made of this connection; to add a capacitor, such as 162 or 181 in FIG. 3 for obtaining a time delay in the response of the NAND gate.

Where more than two inputs to the gate are required, as for three for gates 39, 41 and 47 in FIG. 2, the addition is made by the manufacturer by employing the Signetics type 670A.

Figure 5:
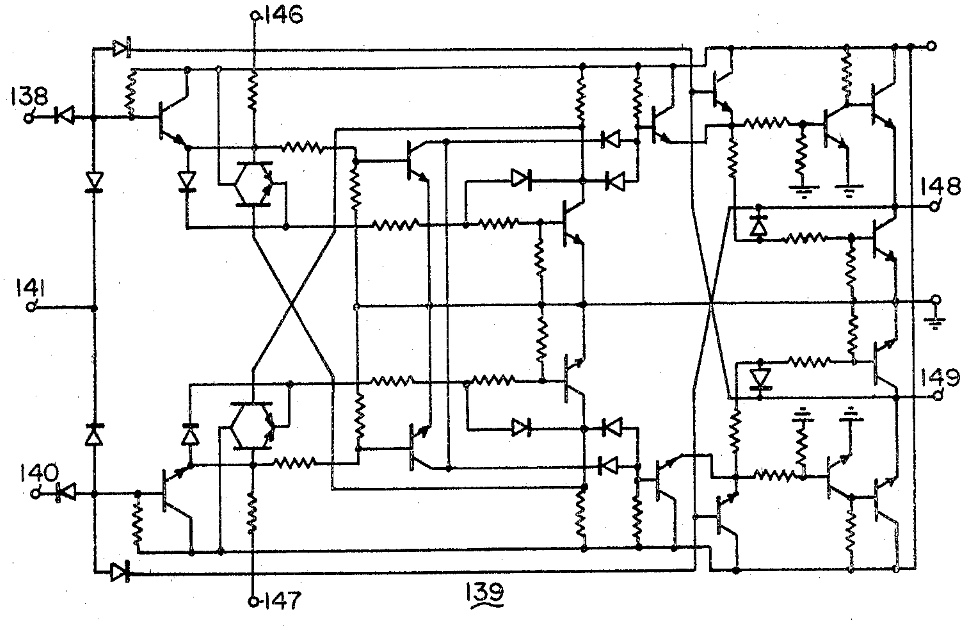
FIG. 5 is a schematic diagram for a "J–K" type flip-flop element.

FIG. 5 is the schematic diagram for a "J–K" type flip-flop element employed for flip-flop 139 in FIG. 3. This is the known Signetics J–K Binary element, 620A.

It is a D.C.-triggered, master-sleeve, J–K flip-flop. In FIG. 5, input terminal 138 is the J input and input terminal 140 is the K input. As used in FIG. 3 these inputs are employed, along with clock input 141, for synchronous switching of state. Master and slave flip-flops are connected by two AND gates within the circuit. As employed, the rising clock pulse cuts the slave from the master and then allows the logic at the J and K inputs to be set into the master flip-flop. When the clock pulse returns to its low level the state of the master is transferred to the slave flip-flop. This determines the output levels at terminals 148 and 149, these being the "Q" and "$\overline{Q}$" values, respectively.

Figure 6:
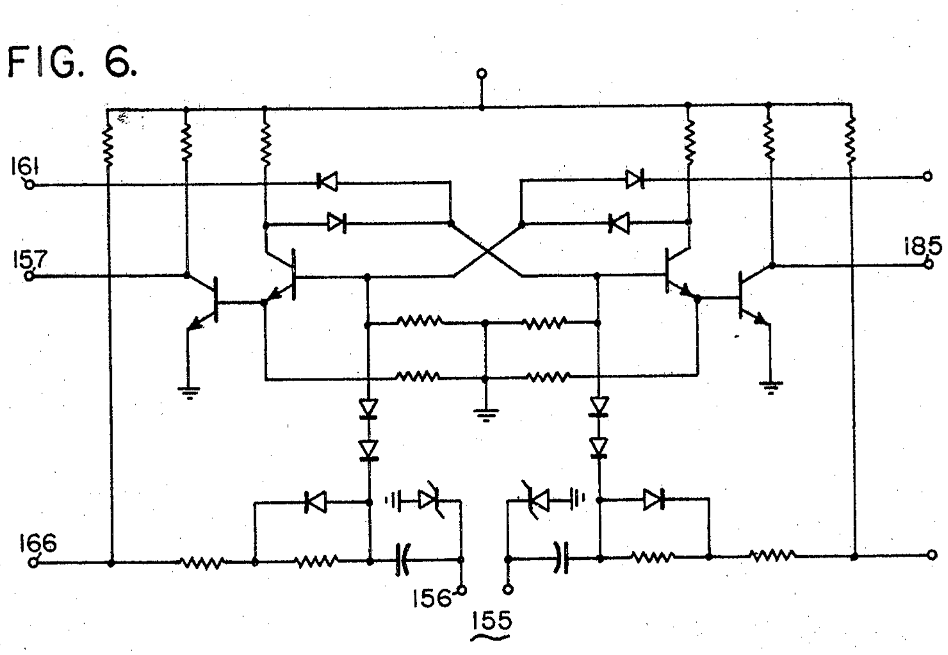
FIG. 6 is a schematic diagram for an RS/T type flip-flop element.

FIG. 6 is the schematic diagram for an RS/T type flip-flop element employed for flip-flops 155 and 164 in FIG. 3. This is the known Signetics RS/T Binary Element, 629A.

It is a flip-flop having capacitive-coupled clock lines, buffered output lines, and is suitable for synchronous (clocked) operation. The input and output terminals have the same identifying numerals as in FIG. 3 for performing the functions that have there been described.

What is claimed is:

1. A sequencing mechanism having electronic logic means comprising:

(a) a manual actuating switch (1),
(b) a motorized switch (5) connected thereto and actuable thereby,
(c) first means (4) to accomplish a first operation,
(d) a first gate logic (53, 21, 39, 41, 47) connected to and actuable by said motorized switch,
 said first gate logic also connected to said first means,
(e) electronic means (92) to produce a signal upon the accomplishment of said first operation,
 said electronic means connected to said first means and to said first gate logic,
(f) second means (154, 175) to accomplish a second operation, and
(g) second gate logic (139, 159) having delay means (162),
 said second gate logic connected to said electronic means and to said second means,
 said second gate logic operable by said signal to actuate said second means and accomplish a second operation.

2. The sequencing mechanism of claim 1, which additionally includes:

(a) third means (200) to accomplish a third operation, and
(b) third gate logic (184, 191) connected to said second gate logic and to said third means,
 said third gate logic operable by said second gate logic
  to actuate said third means,
  to accomplish said third operation.

3. The sequencing mechanism of claim 1 arranged for *manual* operation, in which:

(a) said first gate logic has at least two channels, including a first latch (21) for selectively connecting a said channel to said manual actuating switch (1),
(b) plural logic units,
(c) plural amplifiers,
(d) each said channel having a logic unit (39 or 41) followed by an amplifier (66, 75 or 66′, 75′), and
(e) a connection from each said amplifier to said first means,
 whereby said first operation may be selectively accomplished with plural different selected characteristics associated with a said channel.

4. The sequencing mechanism of claim 1 arranged for *automatic* operation, in which said first gate logic has first and second channels comprising:

(a) a first contact (42) of said motorized switch (5),
(b) a first gate (39) in said first channel of said first gate logic,
(c) a connection (63) between said first contact and said first gate,
(d) a second contact (44) of said motorized switch (5),
(e) a second gate (41) in said second channel of said first gate logic,
(f) a connection (49) between said second contact and said second gate,
(g) a third contact (51) of said motorized switch (5),
(h) a third gate (53) of said first gate logic,
(i) a connection (52) between said third contact and said third gate, and
(j) a connection (54, 55, 56) between said third gate and said first and second gates,
 whereby said first operation is accomplished alternately between said first and second channels by actuation of said motorized switch.

5. The sequencing mechanism of claim 1 in which said second gate logic (139, etc.) is comprised in first part of;

(a) a second latch (127),
(b) a first flip-flop (139) connected to said second latch for actuation thereby, and
(c) a connection from said first flip-flop to a first part (154) of said second means for actuation of the first step by said second means toward accomplishing said second operation.

6. The sequencing mechanism of claim 5 in which said second gate logic is comprised in second part of;
(a) a second flip-flop (155) connected to said first flip-flop (139) for actuation thereby,
(b) a first diode-input gate (159) connected to said second flip-flop for actuation thereby,
(c) a first capacitor (162) connected to the diode-input of said first diode-input gate whereby the output thereof if delayed in time.

7. The sequencing mechanism of claim 6 which additionally includes;
(a) a third flip-flop (64) connected to said second flip-flop (155) for actuation thereby,
(b) a second diode-input gate (180) connected to said third flip-flop for actuation thereby,
(c) a second capacitor (181) connected to the diode-input of said second diode-input gate whereby the output thereof is delayed in time, and
(d) a connection from said third flip-flop to said second part (175) of said second means for actuation of said second step thereof for completing said second operation.

8. The sequencing mechanism of claim 2 in which said third gate logic is comprised of;
(a) a NAND gate (184),
(b) plural connections (183, 186, 188) to said second gate logic for the actuation of said NAND gate in relation to the status of said second gate logic, and
(c) means (191) connected to said NAND gate for reversing the signal phase thereof,
whereby said NAND gate produces an output only when outputs have been produced by said second gate logic by second operations having been accomplished.

9. The sequencing mechanism of claim 8 which additionally includes;
(a) an amplifier (193, 194) connected to said means (191) and
(b) an electrically actuable wire manipulator (9; 200) connected to said amplifier,
whereby sufficient electric power is controlled by said third gate logic to actuate said wire manipulator.

10. The sequencing mechanism of claim 2 which comprises;
(a) a wire clamp electromagnet (154),
(b) a first flip-flop (139),
(c) a connection from ssaid electronic means (92) to said first flip-flop for the actuation thereof by said signal,
(d) a connection from said first fiip-flop to said wire clamp electromagnet to permit clamping action thereby,
(e) a second flip-flop (155) connected to said first flip-flop for actuation thereby,
(f) a third flip-flop (164) connected to said second flip-flop for actuation thereby,
(g) a second electromagnet (175) connected to said third flip-flop to break wire held by said wire clamp elemtromagnet and complete said second operation, and
(h) a third electromagnet (200) connected to said third gate logic (184, 191) to advance said wire as said third operation.

References Cited

UNITED STATES PATENTS

| | | | |
|---|---|---|---|
| 3,235,161 | 2/1966 | Cooper | 228—8 X |
| 3,267,303 | 8/1966 | Meyer et al. | 307—141 |

ROBERT K. SCHAEFER, Primary Examiner

T. B. JOIKE, Assistant Examiner

U.S. Cl. X.R.

219—108; 228—7; 235—151.1